(12) United States Patent
Pluta

(10) Patent No.: US 11,362,573 B1
(45) Date of Patent: Jun. 14, 2022

(54) ROTATING PRESSURE GENERATOR

(71) Applicant: Lukasz Pluta, Brampton (CA)

(72) Inventor: Lukasz Pluta, Brampton (CA)

(*) Notice: Subject to any disclaimer, the term of this patent is extended or adjusted under 35 U.S.C. 154(b) by 0 days.

(21) Appl. No.: 17/208,417

(22) Filed: Mar. 22, 2021

(51) Int. Cl.
*H02K 49/10* (2006.01)
*H02K 21/02* (2006.01)

(52) U.S. Cl.
CPC ......... *H02K 21/024* (2013.01); *H02K 49/106* (2013.01)

(58) Field of Classification Search
CPC ... H02K 21/022–21/027; H02K 49/10–49/106
USPC .............................................. 310/103, 154.49
See application file for complete search history.

(56) References Cited

U.S. PATENT DOCUMENTS 4,196,365 A * 4/1980 Presley .................. H02K 49/10 310/23
4,207,773 A * 6/1980 Stahovic ................ H02K 49/10 74/25
2007/0284956 A1 * 12/2007 Petrovich ................. H02K 7/06 310/152
2010/0187930 A1 * 7/2010 Marquis ............... H02K 49/102 310/113

FOREIGN PATENT DOCUMENTS

EP 2782215 A1 * 9/2014 ............. H02K 1/148

* cited by examiner

*Primary Examiner* — Ramon M Barrera
(74) *Attorney, Agent, or Firm* — Capehart Law Firm

(57) ABSTRACT

A rotating pressure generator includes a rotor and a stator arranged surrounding the rotor. The rotor is adapted to rotate about a central axis and has a body defining an outer surface, and a plurality of first magnets attached to the outer surface extending radially outwardly from the outer surface. Further, the stator includes a plurality of arcuate bodies arrayed circularly and coaxially around the rotor and a plurality of second magnets attached to an inner surface of each of the arcuate bodies. The second magnets are oriented such that a first pole of each second magnet faces a first pole of the first magnet and magnetic polarity of the first pole of the second magnet is identical to a magnetic polarity of the first pole of the first magnet. The rotor rotates about the central axis in response to the reciprocating movements of the plurality of arcuate bodies.

16 Claims, 2 Drawing Sheets

ROTATING PRESSURE GENERATOR

TECHNICAL FIELD

The present disclosure relates, generally, to a rotating pressure generator. More particularly, the present disclosure pertains to a rotating pressure generator suitable for generating rotational energy using permanent magnets.

BACKGROUND

Devices having permanent magnets for performing tasks are generally known in the art. For example, permanent magnets-based devices have been used in a crane or a magnetic levitation train. However, these devices have used the magnetic force of the magnets for lifting heavy objects. However, if rotating power can be obtained by using the magnetic force of the permanent magnets, the obtained rotating power can be used for various applications, resulting into a generation of green energy.

SUMMARY

According to an aspect of the disclosure, a rotating pressure generator is provided. The rotating pressure generator includes a rotor, and a stator arranged surrounding the rotor. The rotor is adapted to rotate about a central axis and has a body defining an outer surface and a plurality of first magnets attached to the outer surface and circularly arrayed around the outer surface. The plurality of first magnets extends radially outwardly from the outer surface. Further, the stator includes a plurality of arcuate bodies arrayed circularly and coaxially around the rotor and arranged at a distance from the outer surface of the rotor. Each arcuate body is adapted to reciprocate in a radial direction between a first position and a second position. Moreover, the stator includes a plurality of second magnets attached to an inner surface of each of the arcuate bodies and extending radially inwardly from the associated inner surface. The second magnets are oriented such that a first pole of each second magnet faces a first pole of the first magnet and magnetic polarity of the first pole of the second magnet is identical to a magnetic polarity of the first pole of the first magnet. The rotor rotates about the central axis in response to the reciprocating movements of the plurality of arcuate bodies.

In an embodiment, the plurality of first magnets is arranged in a plurality of rows arrayed between a first longitudinal end of the body and a second longitudinal end of the body.

In an embodiment, each first magnet is a permanent magnet.

In an embodiment, each first magnet is a rare earth magnet.

In an embodiment, each second magnet is a permanent magnet.

In an embodiment, each second magnet is a rare earth magnet.

In an embodiment, the plurality of second magnets is arranged in a plurality of rows on each arcuate body.

In an embodiment, a direction of movement of each arcuate body is controlled to increase or decrease the repulsive magnetic force between the first magnets and the associated second magnets to cause the rotation of the rotor.

According to an aspect of the disclosure, a device for generating an electric power is provided. The device includes an electric generator to generate electricity, and a rotating pressure generator operatively coupled to the electric generator. The rotating pressure generator includes a rotor adapted to rotate about a central axis and a stator arranged surrounding the rotor. The rotor includes a body defining an outer surface, and a plurality of first magnets attached to the outer surface and circularly arrayed around the outer surface. The plurality of first magnets extends radially outwardly from the outer surface. The stator includes a plurality of arcuate bodies arrayed circularly and coaxially around the rotor and arranged at a distance from the outer surface of the rotor. Each arcuate body is adapted to reciprocate in a radial direction between a first position and a second position. The stator also includes a plurality of second magnets attached to inner surface of each of the arcuate bodies and extending radially inwardly from respective inner surface. The second magnets are oriented such that a first pole of each second magnet faces a first pole of the first magnet and a magnetic polarity of the first pole of the second magnet is identical to a magnetic polarity of the first pole of the first magnet. The rotor rotates about the central axis in response to the reciprocating movements of the plurality of arcuate bodies.

In an embodiment, the plurality of first magnets is arranged in a plurality of rows arrayed between a first longitudinal end of the body and a second longitudinal end of the body.

In an embodiment, each first magnet is a permanent magnet.

In an embodiment, each first magnet is a rare earth magnet.

In an embodiment, each second magnet is a permanent magnet.

In an embodiment, each second magnet is a rare earth magnet.

In an embodiment, the plurality of second magnets is arranged in a plurality of rows on each arcuate body.

In an embodiment, a direction of movement of each arcuate body is controlled to increase or decrease the repulsive magnetic force between the first magnets and the associated second magnets to cause the rotation of the rotor.

For a more complete understanding of the present invention, reference is made to the following detailed description and accompanying drawings. In the drawing, like reference characters refer to like parts throughout the views.

DETAILED DESCRIPTION

Figure 1:
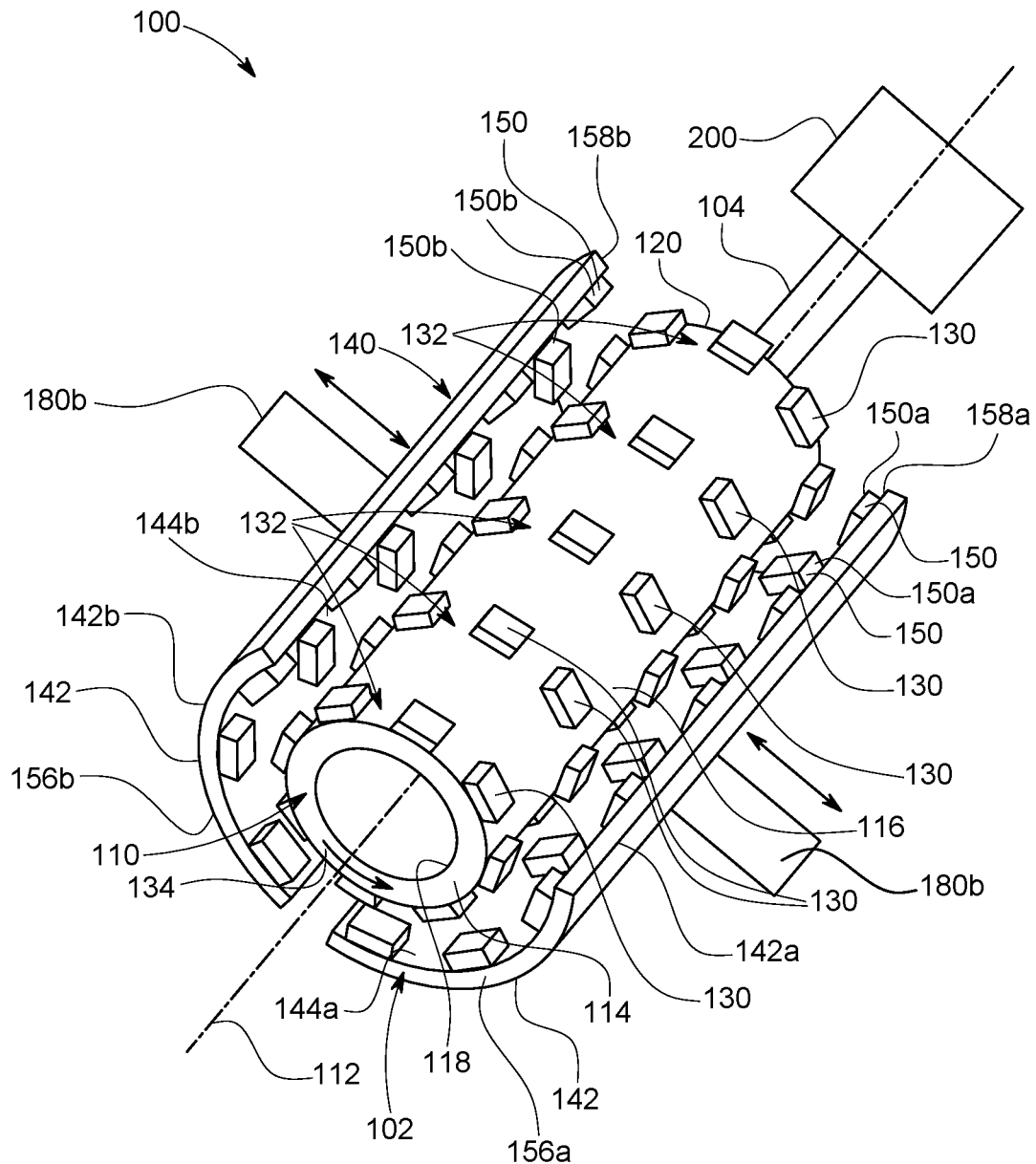
FIG. 1 illustrates a device having a rotating pressure generator for generating rotational energy using permanent magnets, in accordance with an embodiment of the disclosure.

Referring to FIG. 1, a device 100 having a rotating pressure generator 102 suitable for generating rotational energy using permanent magnets is shown. As shown, the rotating pressure generator 102 is operatively coupled to an electric generator 200 of the device 100 for generating electricity. As shown, the rotating pressure generator 102 is coupled with the electric generator 200 via a shaft 104. The shaft 104 is adapted to transfer the rotation from the rotating pressure generator 102 to a rotor (not shown) of the electric generator 200 to enable a generation of the electricity or the electric power. Although, the rotating pressure generator 102 is shown to be attached with the electric generator 200, it may be appreciated the rotating pressure generator 102 may be attached to a pump for providing fluid at high pressure or any other equipment that uses rotational energy for performing work. As shown, the rotating pressure generator 102 (hereinafter referred to as a generator 102) includes a rotor 110 arranged to rotate about a central axis 112 and having a hollow cylindrical body 114 defining an outer surface 116 and an inner surface 118. Although, the rotor 110 having the hollow cylindrical body 114 (hereinafter referred to as body 114) is shown and contemplated, it may be envisioned that the rotor 110 may include a solid cylindrical body, a hollow disc-shaped body, a solid disc-shaped body, or any other shape suitable to rotate around its central axis. The shaft 104 extends from one end 120 (i.e., a first longitudinal end 120) of the rotor 110 and is connected to the electric generator 200 to transfer rotary motion of the rotor 110 to a rotor of the electric generator 200 to enable a generation of the electricity.

Figure 2:
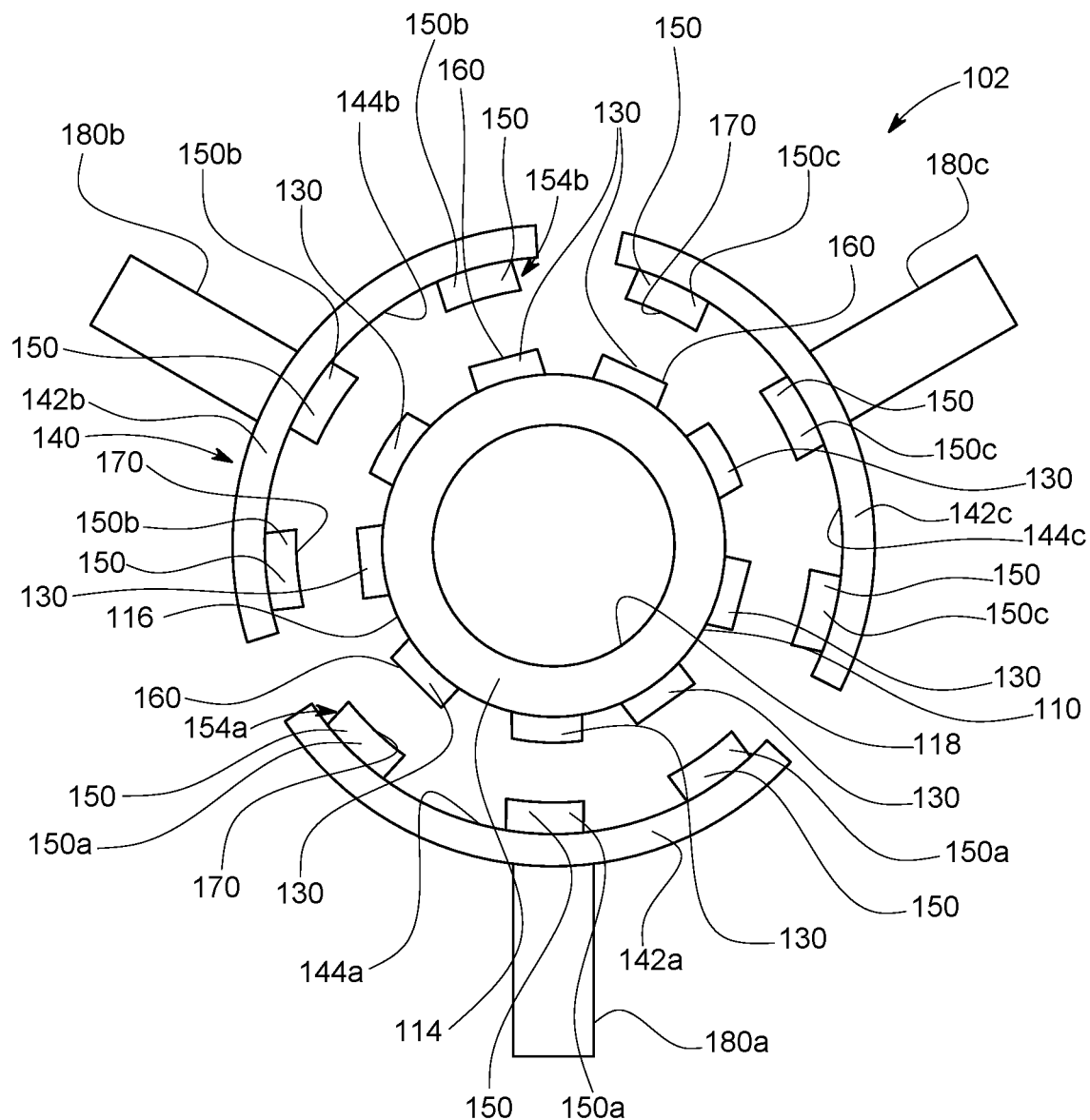
FIG. 2 illustrates an end view of the rotating pressure generator of FIG. 1, in accordance with an embodiment of the disclosure.

As shown in FIG. 1 and FIG. 2, the rotor includes a plurality of first magnets 130 arranged on the outer surface 116 of the body 114 and extending radially outwardly from the outer surface 116. As shown, the plurality of first magnets 130 is arranged in at least one circular row 132, each row 132 having a number of first magnets 130 arrayed circularly around the central axis 112 on the outer surface 116 of the body 114. Further, the rows 132 of the first magnets 130 are arrayed between the first longitudinal end 120 of the body 114 and a second longitudinal end 134 of the body 114, and are arranged at a gap from each other. It may be appreciated that the number of rows 132 of the first magnets 130 and the number of first magnets 130 in each row 132 may be selected based on the application area, the amount of rotational energy required to perform any work, etc. In the embodiment, the first magnets 130 are permanent magnets and are rare earth permanent magnets. In an embodiment, the first magnets 130 are neodymium magnets, and are bar magnets having a first longitudinal end attached to the outer surface 116 and a second longitudinal end arranged outwardly of the body 114 and at a radial distance from the outer surface 116. In an embodiment, the first magnets 130 are bar magnets having substantially rectangular cross-section.

Further, the generator 102 includes a stator 140 having a plurality of arcuate bodies 142, for example, a first arcuate body 142a, a second arcuate body 142b, and a third arcuate body 142c (shown in FIG. 2) arranged coaxially to the rotor 110 and surrounding the rotor 110. As shown, the actuate bodies 142 are circularly arrayed around the rotor 110 and are arranged at a radial distance 'D' from the outer surface 116 of the body 114. As shown, each arcuate body 142 may be defined by a sector of a hollow cylinder or a sector of a hollow disc. Each arcuate body 142 includes an inner surface, for example, the first arcuate body 142a includes an inner surface 144a, the second arcuate body 142b includes an inner surface 144b, and the third arcuate body 142c includes an inner surface 144c, arranged facing the outer surface 116 of the body 114. The stator 140 includes a plurality of second magnets 150 arranged on the inner surfaces 144a, 144b, 144c of the arcuate bodies 142a, 142b, 142c.

As shown, a first set of second magnets 150a of the plurality of second magnets 150 is arranged on the inner surface 144a of the first arcuate body 142a and is arranged in a plurality of rows 154a. The plurality of rows 154a is arrayed between a first longitudinal end 156a and a second longitudinal end 158a of the first arcuate body 142a. Similarly, a second set of second magnets 150b of the plurality of second magnets 150 is arranged on the inner surface 144b of the second arcuate body 142b and is arranged in a plurality of rows 154b. The plurality of rows 154b is arrayed between a first longitudinal end 156b and a second longitudinal end 158b of the second arcuate body 142b. Also, as shown in FIG. 2, a third set of second magnets 150c of the plurality of second magnets 150 is arranged on the inner surface 144c of the third arcuate body 142c and is arranged in a plurality of rows 154c. The plurality of rows 154c is arrayed between a first longitudinal end 156c and a second longitudinal end (not shown) of the third arcuate body 142c. In the embodiment, the second magnets 150 are permanent magnets and are rare earth permanent magnets. In an embodiment, the second magnets 150 are neodymium magnets, and are bar magnets having a first longitudinal end attached to the respective inner surface 144a, 144b, 144c of each arcuate body 142a, 142b 142c and a second longitudinal end arranged a radial distance from the respective inner surface 144a, 144b, 144c. In an embodiment, the second magnets 150 are bar magnets having substantially rectangular cross-section.

Further, each of the arcuate bodies 142a, 142b, 142c is adapted to reciprocate/displace/move linearly in a radial direction relative to the central axis 112 of the rotor 110. Accordingly, each of the arcuate bodies 142a, 142b, 142c is adapted to reciprocate between a first position and a second position to decrease and to increase the radial distance between associated inner surface 144a, 144b, 144c and the outer surface 116 of the body 114, and accordingly to increase or decrease the gap between the first magnets 130 and the facing second magnets 150. Further, the first magnets 130 and the second magnets 150 are arranged and oriented such that a first pole 160 of the first magnet 130 has a magnetic polarity similar or identical to a magnetic polarity of a first pole 170 of the facing second magnet 150. For example, the first magnets 130 and the second magnets 150 are arranged and oriented such that the north pole of the first magnets 130 and the north pole of the second magnets 150 face each other. Accordingly, a repulsive magnetic force between the first magnets 130 and the second magnets 150 of the arcuate bodies 142a, 142b, 142c increases when the arcuate bodies 142a, 142b, 142c move towards the rotor 110 and the repulsive magnetic force between the second magnets 150 and the facing first magnets 130 decreases when the arcuate bodies 142a, 142b, 142c move away from the rotor 110.

To facilitate the reciprocating motion of the arcuate bodies 142a, 142b, 142c, each of the arcuate bodies 142a, 142b, 142c may be connected with an actuator (not shown) connected to extension arms 180a, 180b, 180c that are connected to the outer surfaces of arcuate bodies 142a, 142b, 142c. The extension arms 180, 180b, 180c extend radially outwardly from the outer surface. The actuator may be an electric actuator, a hydraulic actuator, or a pneumatic actuator. By controlling reciprocating movements of the arcuate bodies 142a, 142b, 142c toward the rotor 110 or away from the rotor 110, the repulsive magnetic force between the associated second magnets 150 of each of the arcuate bodies 142 and the facing first magnets 150 may be increased or decreased to enable a rotation of the rotor 110 in the desired direction. For example, the second arcuate body 142b may be moved toward the rotor 110 and the third arcuate body 142c may be moved away from the rotor 110, while keeping the first arcuate body 142a stationary. Accordingly, the repulsive magnetic force between the second set of the second magnets 150b and facing first magnets 130 increases, while the repulsive force between the third set of second magnets 150c and the first magnets 130 facing the third set of magnets 150c decreases. Accordingly, the first magnets 130 facing the second set of second magnets 150b tend to move away from the second set of second magnets 150b, causing the rotation of the rotor 110 in a direction towards the third arcuate body 142c as the repulsive magnetic force between the second magnets arranged on third arcuate body 142c and facing first magnets 130 on the rotor 110 is lesser than the repulsive magnetic force between the second magnets 150a and the facing first magnets 130. Accordingly, the rotor 110 may be rotated by controlling the movement and the relative direction of the movement of the arcuate bodies 142a, 142b, 142c.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

LIST OF ELEMENTS 100 device
102 pressure generator
104 shaft
110 rotor
112 central axis
114 hollow cylindrical body
116 outer surface
118 inner surface
120 first longitudinal end
130 first magnet
132 circular row
134 second longitudinal end
140 stator
142 arcuate body
142a first arcuate body
142b second arcuate body
142c third arcuate body
144a inner surface
144b inner surface
144c inner surface
150 second magnet
150a first set of second magnets
150b second set of second magnets
150c third set of second magnets
154a rows
154b rows
154c rows
156a first longitudinal end
156b first longitudinal end
156c first longitudinal end
158a second longitudinal end
158b second longitudinal end
160 first pole
170 first pole
180a extension arm
180b extension arm
180c extension arm
200 electric generator

What is claimed is:

1. A rotating pressure generator, comprising:
a rotor adapted to rotate about a central axis and including
a body defining an outer surface, and
a plurality of first magnets attached to the outer surface and circularly arrayed around the outer surface, the plurality of first magnets extends radially outwardly from the outer surface; and
a stator arranged surrounding the rotor and having
a plurality of arcuate bodies arrayed circularly and coaxially around the rotor and arranged at a distance from the outer surface of the rotor, each arcuate body is adapted to reciprocate in a radial direction between a first position and a second position, and
a plurality of second magnets attached to an inner surface of each of the arcuate bodies and extending radially inwardly from the respective inner surface, wherein the second magnets are oriented such that a first pole of each second magnet faces a first pole of the first magnet, wherein a magnetic polarity of the first pole of the second magnet is identical to a magnetic polarity of the first pole of the first magnet, wherein the rotor rotates about the central axis in response to the reciprocating movements of the plurality of arcuate bodies.

2. The rotating pressure generator of claim 1, wherein the plurality of first magnets is arranged in a plurality of rows arrayed between a first longitudinal end of the body and a second longitudinal end of the body.

3. The rotating pressure generator of claim 1, wherein each first magnet is a permanent magnet.

4. The rotating pressure generator of claim 3, wherein each first magnet is a rare earth magnet.

5. The rotating pressure generator of claim 1, wherein each second magnet is a permanent magnet.

6. The rotating pressure generator of claim 5, wherein each second magnet is a rare earth magnet.

7. The rotating pressure generator of claim 1, wherein the plurality of second magnets is arranged in a plurality of rows on each arcuate body.

8. The rotating pressure generator of claim 1, wherein a direction of movement of each arcuate body is controlled to increase or decrease the repulsive magnetic force between the first magnets and the associated second magnets to cause the rotation of the rotor.

9. A device for generating an electric power, the device comprising:
an electric generator to generate electricity; and
a rotating pressure generator operatively coupled to the electric generator and comprising:
a rotor adapted to rotate about a central axis and including
a body defining an outer surface, and
a plurality of first magnets attached to the outer surface and circularly arrayed around the outer surface, the plurality of first magnets extends radially outwardly from the outer surface; and
a stator arranged surrounding the rotor and having
a plurality of arcuate bodies arrayed circularly and coaxially around the rotor and arranged at a distance from the outer surface of the rotor, each arcuate body is adapted to reciprocate in a radial direction between a first position and a second position, and
a plurality of second magnets attached to an inner surface of each of the arcuate bodies and extending radially inwardly from the respective inner surface, wherein the second magnets are oriented such that a first pole of each second magnet faces a first pole of the first magnet, wherein a magnetic polarity of the first pole of the second magnet is identical to a magnetic polarity of the first pole of the first magnet, wherein the rotor rotates about the central axis in response to the reciprocating movements of the plurality of arcuate bodies.

10. The device of claim 9, wherein the plurality of first magnets is arranged in a plurality of rows arrayed between a first longitudinal end of the body and a second longitudinal end of the body.

11. The device of claim 9, wherein each first magnet is a permanent magnet.

12. The device of claim 11, wherein each first magnet is a rare earth magnet.

13. The device of claim 9, wherein each second magnet is a permanent magnet.

14. The device of claim 13, wherein each second magnet is a rare earth magnet.

15. The device of claim 9, wherein the plurality of second magnets is arranged in a plurality of rows on each arcuate body.

16. The device of claim 9, wherein a direction of movement of each arcuate body is controlled to increase or decrease the repulsive magnetic force between the first magnets and the associated second magnets to cause the rotation of the rotor.

\* \* \* \* \*